United States Patent [19]

Grald et al.

[11] Patent Number: 4,873,649

[45] Date of Patent: Oct. 10, 1989

[54] METHOD FOR OPERATING VARIABLE SPEED HEAT PUMPS AND AIR CONDITIONERS

[75] Inventors: Eric W. Grald, Maple Plain; J. Ward MacArthur, Minneapolis, both of Minn.

[73] Assignee: Honeywell Inc., Minneapolis, Minn.

[21] Appl. No.: 206,052

[22] Filed: Jun. 10, 1988

[51] Int. Cl.[4] .................... G05D 23/24; F24F 3/14
[52] U.S. Cl. .................. 364/505; 62/176.6; 62/226; 364/413.3
[58] Field of Search ............... 364/552, 413.3, 505; 62/129, 209, 215, 229, 176.1, 176.3, 176.6, 126; 237/2 B; 73/189

[56] References Cited

U.S. PATENT DOCUMENTS

| | | | |
|---|---|---|---|
| 4,024,725 | 5/1977 | Uchida et al. | 62/209 |
| 4,154,104 | 5/1979 | Worthington | 73/189 |
| 4,232,530 | 11/1980 | Mueller | 62/209 |
| 4,257,795 | 3/1981 | Shaw | 62/209 |
| 4,379,712 | 4/1983 | Sperr, Jr. et al. | 62/314 |
| 4,611,470 | 9/1986 | Enstrom | 62/129 |
| 4,612,621 | 9/1986 | Kaya et al. | 364/494 |
| 4,663,703 | 5/1987 | Axelby et al. | 364/149 |
| 4,669,058 | 5/1987 | Schneider et al. | 364/148 |
| 4,710,864 | 12/1987 | Li | 364/148 |
| 4,719,561 | 1/1988 | Shigemasa | 364/148 |
| 4,720,982 | 1/1988 | Shimizu et al. | 62/204 |
| 4,725,001 | 2/1988 | Carney et al. | 62/231 |
| 4,738,118 | 4/1988 | Kanazawa | 62/215 |
| 4,771,611 | 9/1988 | McNab | 62/324.1 |

OTHER PUBLICATIONS

Fanger, P. O., Thermal Comfort, McGraw-Hill, New York, 1970 Textbook, pp. 37–42 and 107–142.

Primary Examiner—Felix D. Gruber
Attorney, Agent, or Firm—C. G. Mersereau

[57] ABSTRACT

A controller and a related method that maintains thermal comfort in an occupied space at a user-defined level while simultaneously maximizing the efficiency of the space conditioning equipment. The controller determines the setting of heating/cooling capacity, indoor airflow rate, evaporator superheat and other system parameters such that a comfort constraint is satisfied. The comfort index may be any arbitrarily-defined relationship of measured or inferred quantities such as air temperature, relative humidity, air velocity, mean radiant temperature, $CO_2$ concentration, etc. The controller ensures that the error between comfort index and the comfort setpoint is zero while the energy consumed by the space conditioning equipment is minimized.

10 Claims, 6 Drawing Sheets

METHOD FOR OPERATING VARIABLE SPEED HEAT PUMPS AND AIR CONDITIONERS

The invention relates to a method for achieving the optimal comfort and optional efficiency control of variable speed heat pumps and air conditioners.

BACKGROUND OF THE INVENTION

Up to the present time, residential heating and cooling equipment has primarily been controlled by temperature-sensing thermostats. In recent years, some manufacturers have incorporated humidity sensing in their controls. Humidity control has most often been accomplished through a "dehumidifying cycle" or through "humidity reset" (adjustment of the temperature setpoint) rather than through an integrated comfort control strategy. As attention in the HVAC industry becomes increasingly focused on providing greater comfort, the need for continuous control of humidity, as well as other environmental parameters (such as relative air velocity, mean radiant temperature, $CO_2$ concentration and air contaminants) becomes more critical.

The advent of AC inverter technology has made relatively low-cost variable-speed compressors, fans and blowers possible in residential heat pumps and air conditioners. In addition to heat pumps and air conditioners, variable-capacity operation is becoming possible with conventional heating-only systems. Variable-capacity operation allows greater flexibility as to, how the equipment is controlled. The goal therefore becomes that of not only maintaining adequate comfort, but also doing so in the most energy efficient manner.

Not only is it desirable to control the thermal parameters described above, but due to the increased emphasis placed on controlling indoor air quality, it becomes necessary to also control air contaminants such as $CO_2$, Volatile Organic Compounds VOC's and particulates. Conventional, single-variable control strategies are not appropriate for this more advanced level of control. Therefore a more sophisticated approach is required.

SUMMARY OF THE INVENTION

With the advent of microcomputer-based type thermostats, more sophisticated control functionality is possible by utilizing the memory that accompanies the micro-computer to implement a control program.

The main objective of the present invention is to provide a new and improved method for controlling, as a minimum, the compressor speed, indoor fan speed and evaporator superheat of a heat pump or air conditioner in such a manner that human thermal comfort is maintained and plant (space conditioning equipment) efficiency is maximized.

The sensor means, microcomputer means, memory means and actuator means allow a microcomputer-based thermostat to measure necessary thermal and air quality conditions within a space and, from these measurements and user inputs, to: construct a comfort setpoint, construct a comfort index, determine the space conditioning plant efficiency, identify the sensitivity of the measured comfort parameters to changes in the controlled system parameters, compute the changes in space conditioning parameters necessary to eliminate any error between the measured comfort index and the desired comfort level while insuring maximally efficient operation, and output these system operating parameters as control signals to the space conditioning equipment. The control program ensures maximum plant efficiency while providing the desired level of comfort.

Since this strategy results in optimal control, any other choice of compressor speed, blow speed and evaporator superheat will result in either increased energy consumption or reduced comfort.

In a typical variable-capacity system, the compressor speed is controlled based on the air temperature in the conditioned space, while the blower speed is controlled based on the compressor speed and the evaporator superheat is generally controlled by some arbitrary, preset value. The desired temperature will be maintained but, depending upon the conditions in the space, other variables such as humidity, air velocity, etc. may result in unacceptable comfort. It is possible that this comfort deviation will result in increased energy consumption (for example, over-dehumidification).

In addition to dry bulb temperature control, it is possible to compensate for latent effects by incorporating humidity measurements into the controller. This compensation can be done by either incrementally adjusting the dry-bulb setpoint (humidity reset) or by periodically switching between dry-bulb and humidity control. The problem with these and other existing approaches is that no mechanisms exist for independently specifying the values of the manipulated or control variables (compressor speed, blower speed, evaporator superheat) that will maintain precise comfort control while maximizing efficiency. The present invention provides a means of accomplishing this objective.

The control system according to the present invention provides a comfort control means, including: microcomputer means including real time clock means and memory means; data input means for specifying desired comfort level; multiple sensor means for measuring all parameters that comprise the comfort index as well as energy efficiency and key temperatures of the space conditioning system; actuator means for outputting control variable signals; said microcomputer means and said memory means including optimal comfort control program means which is memory means providing control means of multiple sensory data, calculation means to construct a single index representative of comfort, and control means of multiple outputs such that plant efficiency is maximized and said comfort index equals the comfort setpoint.

The above and other objects, features and advantages of the invention will become more apparent from the ensuing detailed description taken in conjunction with the accompanying drawings and the appended claims.

DESCRIPTION OF THE PREFERRED EMBODIMENT

In FIGS. 1 to 4, the performance of a specific air conditioning plant (in this instance a heat pump) is given in terms of sensible capacity, latent capacity and coefficient of performance (COP) as a function of compressor speed, indoor air flow rate and evaporator superheat which are the manipulated variables.

Figure 1:
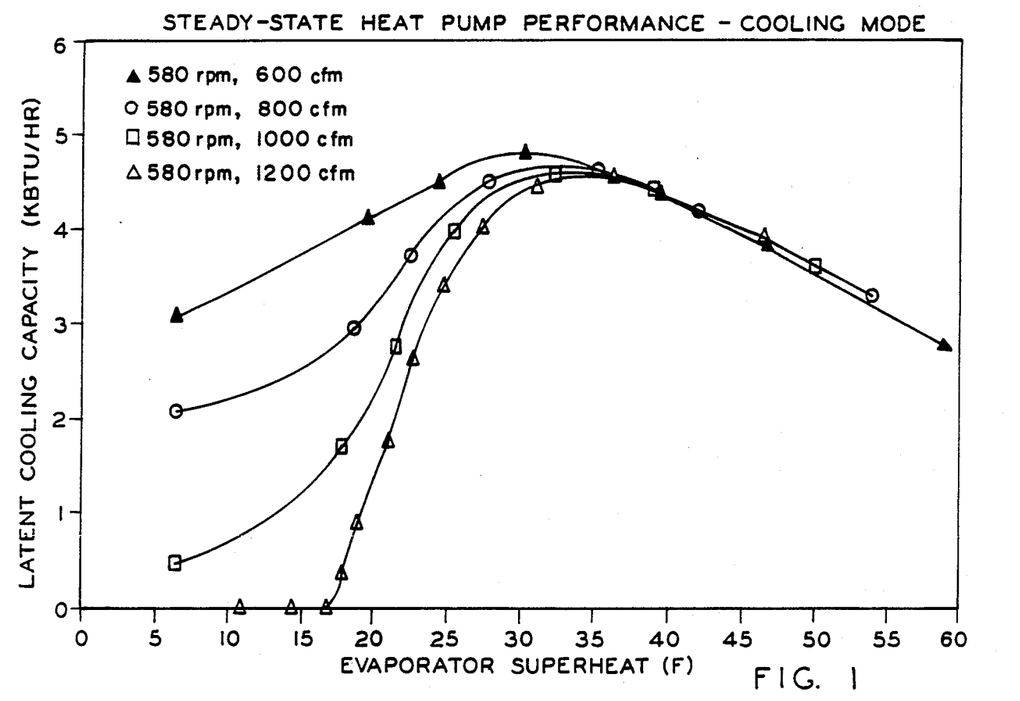
FIGS. 1 to 4 are graphs showing the variation of latent and sensible capacity and coefficient of performance (COP) as a function of compressor speed, blower speed and evaporator superheat for a specific heat pump installation.
Figure 2:
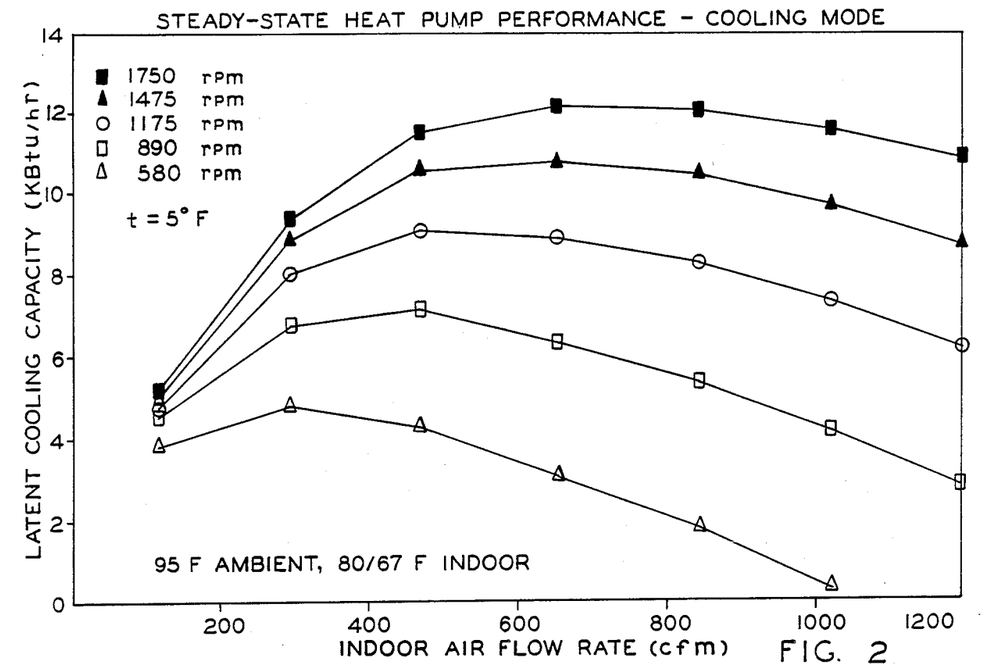
Figure 3:
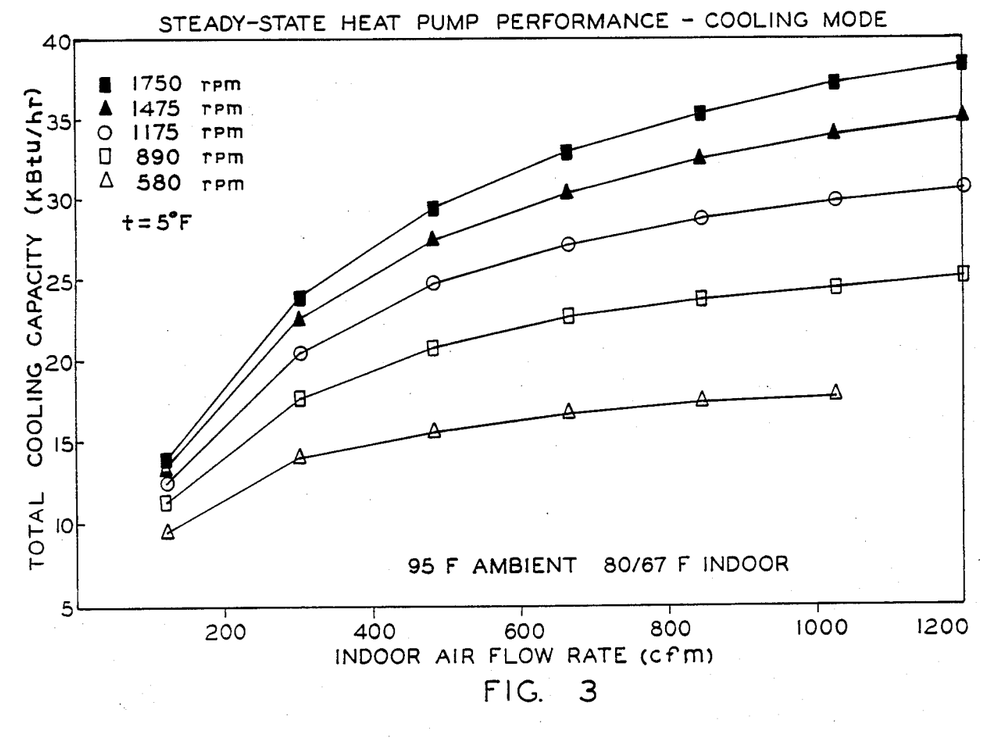
Figure 4:
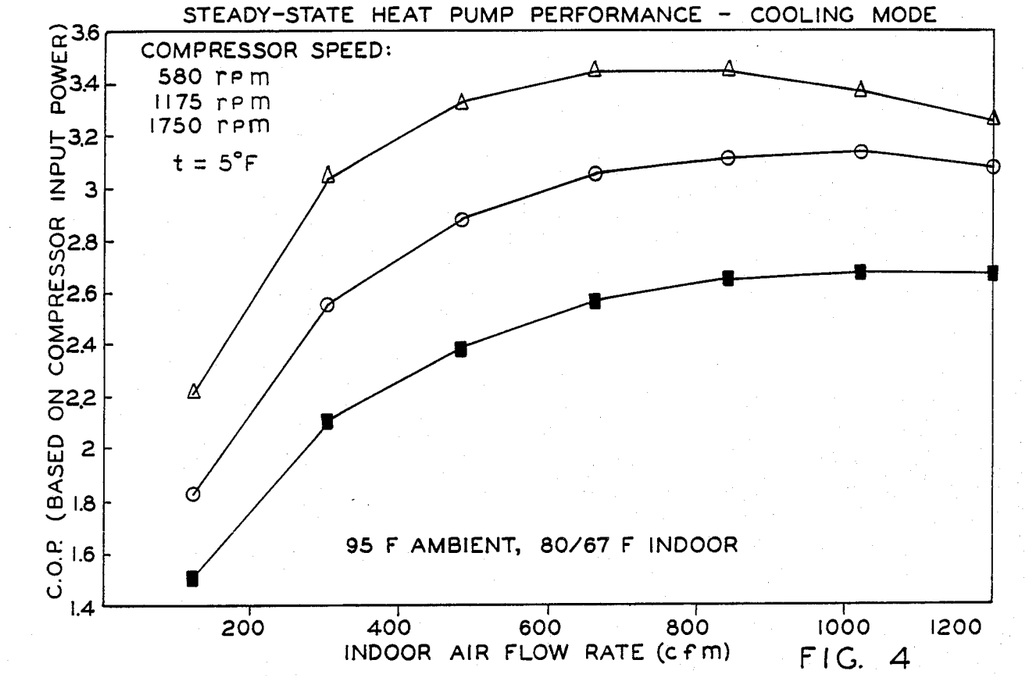

FIG. 1 shows the variation of latent cooling capacity as a function of evaporator superheat for minimum compressor speed and four indoor airflow rates. This figure indicates that under normal operating conditions, there is no latent cooling for full indoor airflow. The latent capacity can be dramatically increased by lowering the indoor air flow rate or increasing the evaporator superheat (by constricting the expansion valve). Both of these actions serve to lower the evaporating temperature. FIGS. 2 and 3 show the variation of latent cooling capacity and total cooling capacity, respectively, for a range of indoor airflow rates and compressor speeds. The evaporator superheat is a constant 5° F. FIG. 4 shows the variation of COP with indoor air flow rate and compressor speed. It may be noted that the highest COPs do not always occur at full air flow. This will depend on the power consumption characteristics of the variable-speed indoor blower.

A complex relationship exists between the manipulated variables, comfort and COP. Only one combination of the manipulated variables exists such that the space conditioning equipment will consume the least amount of power (i.e., maximum COP) while simultaneously providing the desired level of comfort. In the following description, a control means is disclosed for systematically determining the proper manipulated or control variable values to achieve this optimal operating input.

Figure 5:
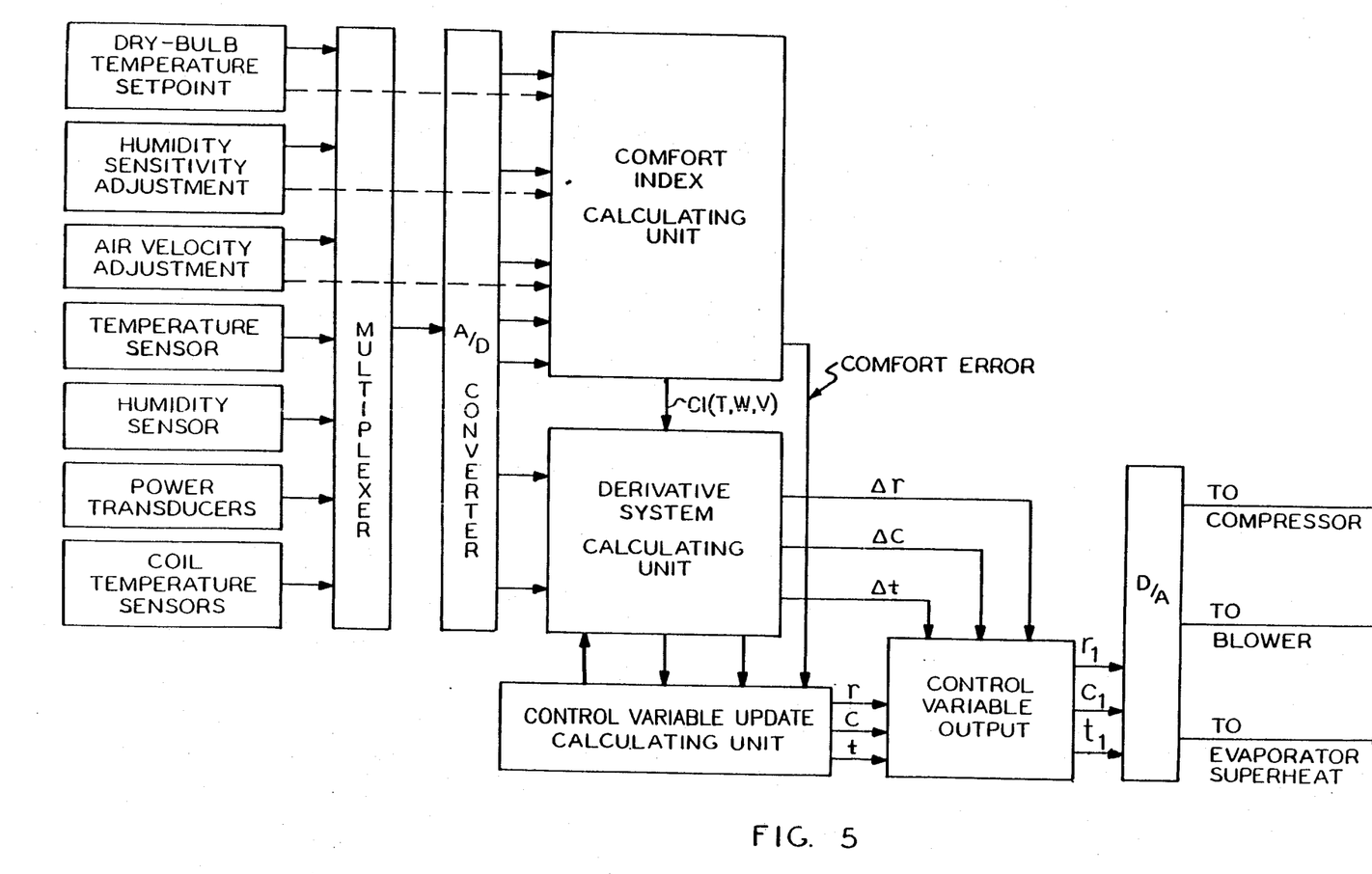
FIG. 5 is a block diagram showing an embodiment of the optimal control system according to the invention.

A preferred embodiment of an optimal comfort control system of the invention will now be described with reference to FIG. 5. As shown in FIG. 5, multiple temperature sensor means, humidity sensor means and the like (e.g., mean radiant temperature, $CO_2$, particulate, VOC sensing means) and power transducer means are provided for comfort sensing and power consumption sensing elements, respectively. The comfort sensing elements are provided at suitable locations in the conditioned space. The power transducer elements and additional temperature sensor elements are provided at suitable locations in the space conditioning plant (i.e., heat pump, air conditioner, etc.) Data input means are provided for establishing a comfort setpoint.

Analog outputs from the comfort sensing elements and data input means are converted into respective digital signals by an A/D converter. The data inputs may also be digital signals and therefore not require A/D conversion. These digital signals are supplied to a microcomputer. In the microcomputer, the said comfort index calculating means computes a comfort setpoint using the dry-bulb temperature setpoint, the humidity sensitivity adjustment and plus the air velocity sensitivity adjustment.

The comfort index calculating means is also responsive to the outputs from comfort sensing elements for effecting a calculation of the instantaneous comfort index. The outputs of the comfort index calculation means are the discrepancy between the comfort setpoint and the instantaneous comfort index itself. The system derivative calculating means is responsive to the outputs from the comfort index calculation means and the power transducer elements and temperature sensing means for establishing a relationship between the comfort index, plant efficiency and changes to the control variables. The system derivative calculating means is also responsive to the output of the control variable calculation means. The control variable calculating update means is responsive to the output of the system derivative calculation means and the output of the comfort index calculating means for effecting the calculation of the values of each of the manipulated variables. The control variable output means is responsive to the output of the control variable update calculating means and the system derivative calculating means for effecting the actual control variable command signals. The control variable command signals are converted to analog outputs by a D/A converter. Each analog output is supplied to the appropriate actuator in the space conditioning equipment.

In the discussion below, a more detailed description of the comfort index calculating means, the system derivative calculating means and control variable update calculating means is given.

In general, comfort is a function of many physical properties of the conditioned space including non-thermal factors, such as air contaminants. While this invention is not dependent on the functional relationships that define comfort, the preferred embodiment utilizes Fanger's Predicted Mean Vote, or PMV, as a measure of comfort 1.

[1] Fanger, P.O., Thermal Comfort, McGraw-Hill, New York, 1970.

The PMV is based on an energy balance imposed on the human body. The PMV reflects human thermal comfort. Conditions that result in a PMV of 0 are considered comfortable for 95 percent of a given population. In this invention, the comfort index (CI) is taken to be a non-linear function of sensed temperatures, humidity and air velocity. Thus the comfort index is given by:

$$CI = CI(T, w, V) \qquad (1)$$

where
T = Sensed temperatures,
w = Humidity
V = Air velocity

At this point, it should be emphasized that the choice of a comfort constraint relation is purely arbitrary. Any function incorporating terms for temperature, humidity, velocity, etc., $CO_2$ concentration, particulates and other air contaminants is suitable.

The comfort setpoint is not a parameter that can be easily specified by a typical human occupant. Therefore a mechanism is required to construct the comfort setpoint from parameters that are readily specified by the user. There are many ways that this can be accomplished. In the preferred embodiment of this invention, the user sets the desired dry-bulb temperature and the comfort index calculating unit assumes default values for all other parameters appearing in the comfort index relationship. Said unit then calculates the desired comfort setpoint. It is realized that the default values assumed will not in general satisfy the comfort demands of the population at large, therefore means are provided to adjust any and all other parameters appearing in the comfort index relationship. In the preferred embodiment, these means are provided by a mechanism to incrementally adjust the assumed default values such as humidity and air velocity. Therefore the comfort setpoint ($CI_{set}$) is given by:

$$CI_{set} = CI(T_{set}, w_{def} + \Delta w, V_{def} + \Delta V) \qquad (2)$$

where $T_{set}$=dry-bulb temperature setpoint
$w_{def}$=default humidity
$\Delta w$=incremental humidity adjustment
$V_{def}$=default air velocity
$\Delta V$=incremental air velocity adjustment The default values are typically not constants. It should be noted that the sensed temperatures, humidity, air velocity, etc. will in general be a function of the control variables. Therefore, the comfort index can also be expressed as:

$$CI = CI(r,c,t) \tag{3}$$

where
r=compressor speed
c=blower speed
t=evaporator superheat

The discrepancy between the comfort setpoint and the instantaneous comfort index is the comfort error, CE. This comfort error is given by:

$$CE = CI_{set} - CI \tag{4}$$

The comfort error along with the comfort index are the outputs of the comfort index calculating unit.

The system derivative calculating unit relates the comfort index and space conditioning performance efficiency to changes in the manipulated variables. To accomplish this the controller must monitor the performance efficiency. For a heat pump the performance efficiency (PE) or coefficient of performance (COP) is given by:

$$COP = COP(r, c, t) = \frac{Q_{evap}}{W_{compr} + W_{fans}} \tag{5}$$

Since $Q_{evap}$ is difficult to measure directly, the preferred embodiment determines the performance efficiency from the following relationship:

$$PE = PE(r, c, t) = \frac{T_2 \cdot W_{compr}}{(T_1 - T_2)(W_{compr} + W_{fans})} \tag{6}$$

In equations (5) and (6) the following definitions apply:
$Q_{evap}$=cooling capacity
$W_{compr}$=power input to compressor
$W_{fans}$=power input to blower and outdoor fan
$T_2$=temperature of evaporator coil
$T_1$=temperature of condenser coil As is the case with CI(r,c,t), performance efficiency of the space conditioning system is also a nonlinear function of r, c and t. A complex relationship exists between these parameters and the CI(r,c,t). The coupling is established through the space conditioning system and the conditioned environment. The capacity of the system (both sensible and latent) along with the ambient conditions establish the internal conditions that in turn dictate CI.

A systematic mechanism is required to establish the appropriate values of r, c and t that simultaneously satisfy the comfort setpoint and maximize COP. There are several ways of performing this task. In the preferred embodiment of the present invention, this task is accomplished by performing a dynamic nonlinear optimization. To do this, it is convenient to relate the two functions, PE and CE, through the Hamiltonian, H, which is given by:

$$H = L(x,u) + \lambda^T f(x,u) \tag{7}$$

where
L(x,u)=performance index
f(x,u)=constraint relation(s)
$\lambda$=Langrangian multiplier(s)
x=state parameters
u=decision vector Thus for this problem, the Hamiltonian becomes $$H = PE + \lambda \cdot CE \tag{8}$$

The solution to the optimization problem, called a stationary point, is where dL=0 for arbitrary du, while holding df=0 (letting dx change as it will). The necessary conditions for a stationary value of L(x,u) are:

$$f(x, u) = 0; \frac{\partial H}{\partial x} = 0; \frac{\partial H}{\partial u} = 0 \tag{9}$$

Since the choice of which variables to designate as decision parameters is not unique, it is only a matter of convenience to make a distinction between decision and state parameters. Here we select the decision vector to be composed of all the manipulated variables, namely r, c and t. With this formulation, there are four unknowns (r, c, t and $\lambda$), hence four equations are needed to obtain a solution. The following four functions are derived from Equations (8) and (9):

$$f_1 = \frac{\partial H}{\partial \lambda} = CE \tag{10}$$

$$f_2 = \frac{\partial H}{\partial r} = \frac{\partial PE}{\partial r} + \frac{\partial CE}{\partial r} \tag{11}$$

$$f_3 = \frac{\partial H}{\partial c} = \frac{\partial PE}{\partial c} + \frac{\partial CE}{\partial c} \tag{12}$$

$$f_4 = \frac{\partial H}{\partial t} = \frac{\partial PE}{\partial t} + \frac{\partial CE}{\partial t} \tag{13}$$

The problem now becomes one of finding values of r, c, t and $\lambda$ such that functions $f_1$ through $f_4$ vanish. These values are then the solution to the optimization problem.

Unfortunately, in typical space conditioning applications, function $f_1$ through $f_4$ are not directly measurable and they are generally time-dependent. Thus, the system to be controlled must be identified. In the present invention, the system is identified by observing how $f_1$ through $f_4$ change with respect to each of the control variables and $\lambda$. The derivatives of $f_1$ through $f_4$ are determined by periodically perturbing the control variables and about their current values. After these perturbations are complete, the derivatives may be written in matrix form as the Jacobian, J, which is:

$$J = \begin{bmatrix} \frac{\partial f_1}{\partial \lambda} & \frac{\partial f_1}{\partial r} & \frac{\partial f_1}{\partial c} & \frac{\partial f_1}{\partial t} \\ \frac{\partial f_2}{\partial \lambda} & \frac{\partial f_2}{\partial r} & \frac{\partial f_2}{\partial c} & \frac{\partial f_2}{\partial t} \\ \frac{\partial f_3}{\partial \lambda} & \frac{\partial f_3}{\partial r} & \frac{\partial f_3}{\partial c} & \frac{\partial f_3}{\partial t} \\ \frac{\partial f_4}{\partial \lambda} & \frac{\partial f_4}{\partial r} & \frac{\partial f_4}{\partial c} & \frac{\partial f_4}{\partial t} \end{bmatrix} \quad (14)$$

The Jacobian and functions $f_1$ through $f_4$ are outputs of the system derivative calculating means and are required by the control variable update calculating means. The control variable update calculating means is used to establish the values of the control variables and $\lambda$ necessary to satisfy the comfort setpoint and simultaneously minimize energy consumption. The update is given by:

$$\begin{bmatrix} \lambda \\ r \\ c \\ t \end{bmatrix}_{new} = \begin{bmatrix} \lambda \\ r \\ c \\ t \end{bmatrix}_{old} + J^{-1} \begin{bmatrix} f_1 \\ f_2 \\ f_3 \\ f_4 \end{bmatrix} \quad (15)$$

Constraints on the control variables are handled by removing the constrained control variable from the update procedure and assigning it the value of the constraint. Note that the algorithm given by Equation (15) is completely generic. That is, no assumptions have been made about the type of conditioned space conditioning equipment being controlled nor have any assumptions been made about the environment.

Figure 6:
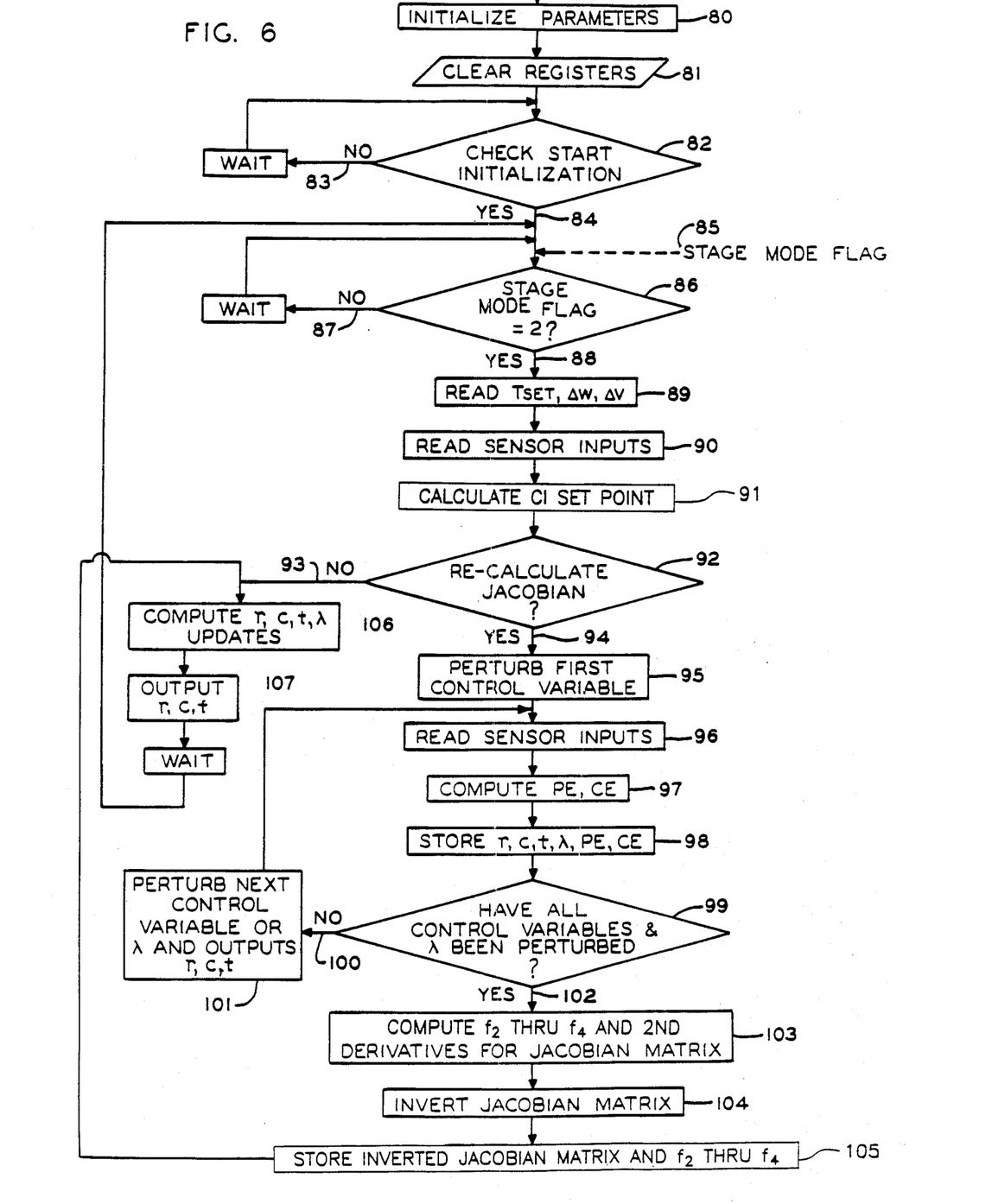
FIG. 6 is a flowchart showing the basic operation of the device.

In order to further explain the operation of the present device, the optimal comfort control executive flowchart is disclosed in FIG. 6. At block 80 the parameters are initialized and at 81 the registers are cleared. The output of 81 is fed to a check start initialization device at 82 which provide a "no" indication at 83, or can continue at 84. If the sequence is continued at 84 then the major control loop is entered. The stage mode flag at 85 is made available from an auxiliary element such as a conventional multistage thermostat not described in the current invention. At 86 the stage mode is checked which can provide a "no" indication at 87 or can continue with the sequence at 88. If the current mode is modulating and not on/off then mode =2 and the sequence continues at 89 where the user inputs are read, these values are then stored and the sequence continues at 90 where the sensors are read as is the real time clock. With this information the data flow is to 91 where CI is calculated. The output of 91 is fed to a check Jacobian calculating device which can provide a "no" output at 93 or a "yes" output at 92. If "yes", the Jacobian is reevaluated and data flow proceeds to 95 where a series of perturbations on each control variable is initiated. At 96 the results of the control variable perturbation is read from the sensor inputs. The output of 96 is fed to 97 where the performance efficiency (PE) and comfort error (CE) are computed. At 98 the current value of each control variable ($\lambda$, PE and CE) is stored. The output of 98 enters a check 99 to determine if each control variable and $\lambda$ has been perturbed. 98 can provide either a "yes" at 102 or a "no" at 100. If "no" the sequence continues at 101 where the perturbation continues. If yes data flows to 103 where $f_2$ through $f_4$ are calculated as are the second derivatives necessary to form the Jacobian. The output of 103 is fed to 104 where the Jacobian is inverted. At 105 the results of the inversion along with $f_2$ through $f_4$ are stored. With this information the data flow is on to 106 which can also be reached from 93 if the result of the Jacobian recalculation check was "no". At 106 the new control variables are determined based on either the old or new Jacobian and the current value of the comfort error and the old value of the control variables. The output of 106 proceeds to 107 where the new value of the control variables are output to the space calculating system.

Figure 7:
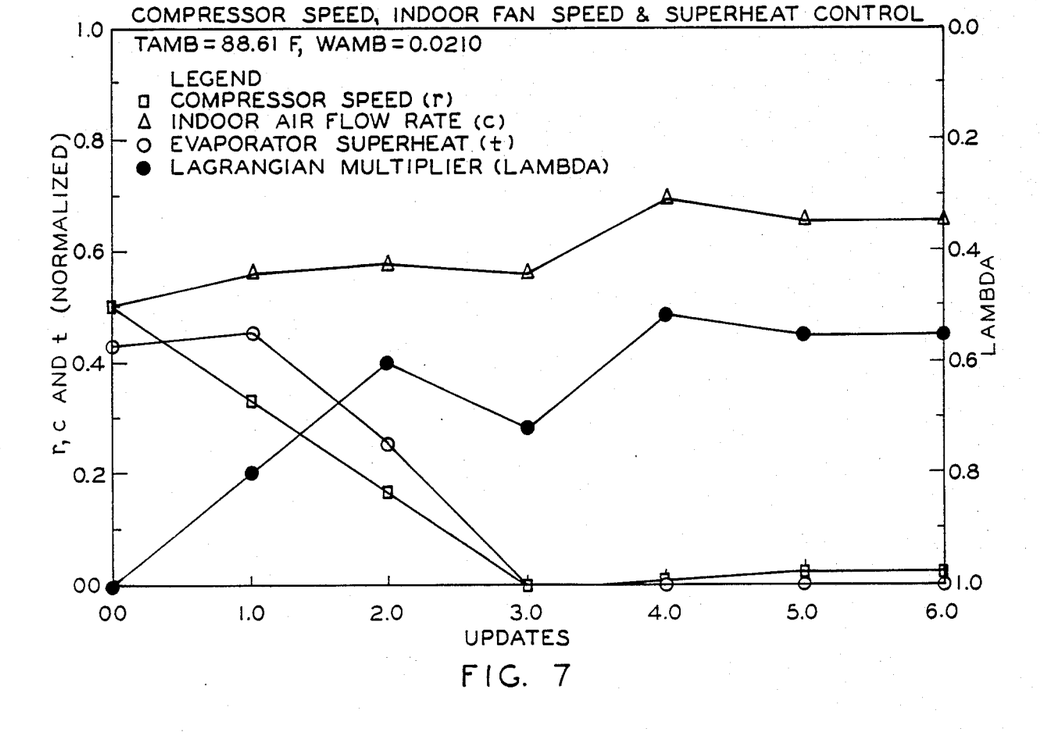
FIGS. 7, 8, 9A and 9C show the performance of the device in a specific application.
Figure 8:
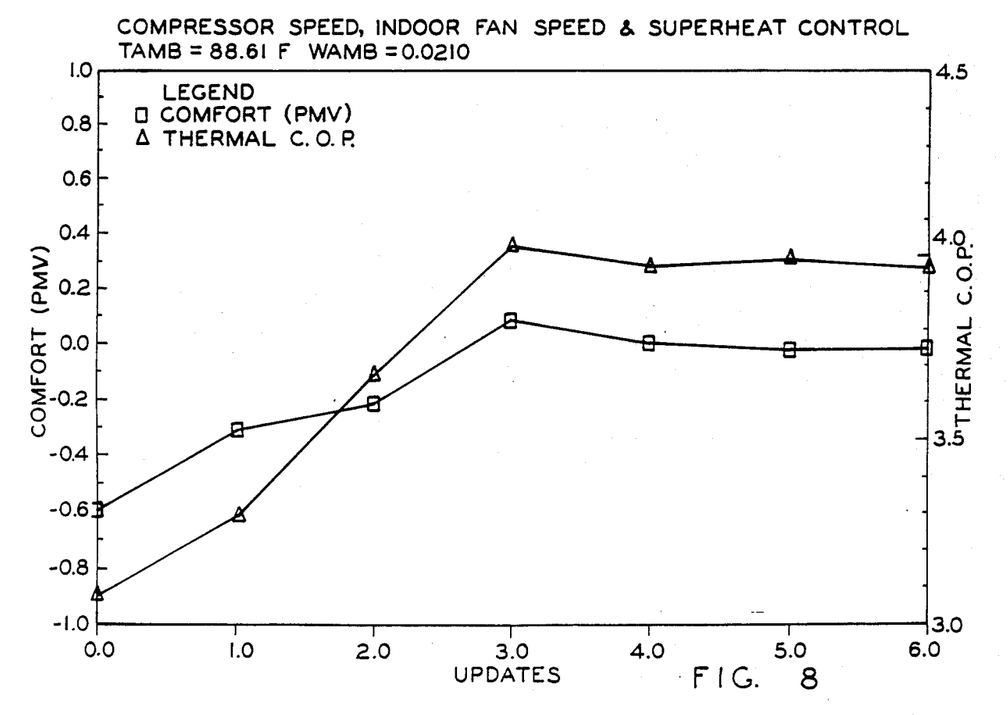
Figure 9A:
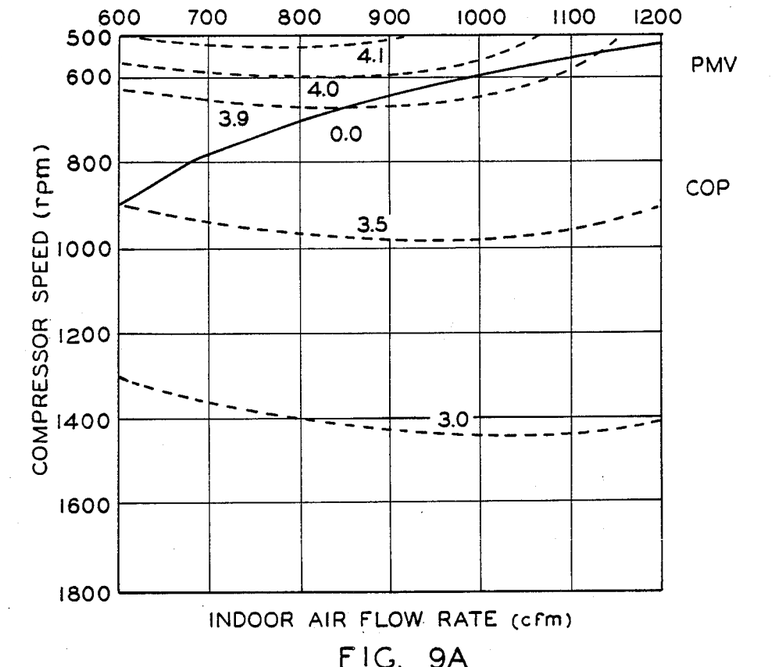
Figure 9B:
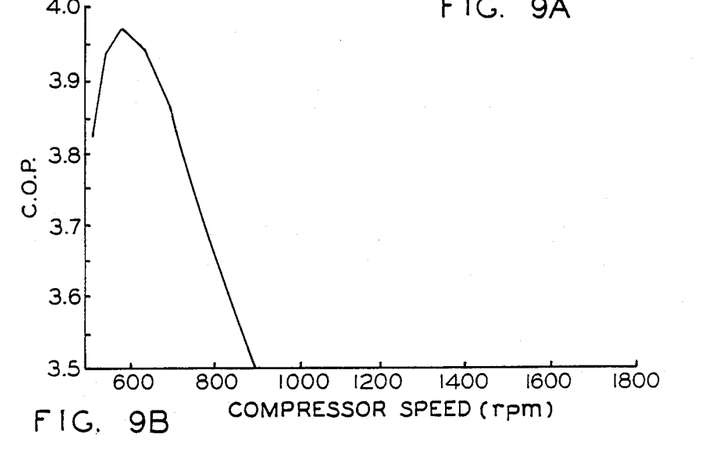
Figure 9C:
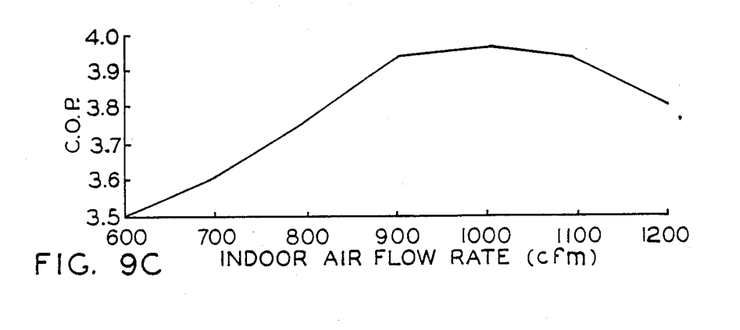

The performance of this controller for a typical residence operating during the cooling season is shown in FIGS. 7, 8 and 9. In these figures the space conditioning plant is a heat pump. For this system the comfort error is given in terms of PMV and the performance efficiency is given in terms of COP. The control variables are compressor speed, r, indoor blower speed, c, and evaporator superheat, t. A thermal load is imposed on the space and the control variables are initialized at some arbitrary initial value. The algorithm is then allowed to proceed. The nominal operating range is:

500 to 1800 compressor speed
600 to 1200 indoor air flow

The control moves needed to obtain optimal conditions are shown in FIG. 7. The optimal solution was obtained in only 6 updates. In this figure the control variables have been normalized using the ranges enumerated above. The corresponding impact these moves have on comfort and heat pump performance is shown in FIG. 8. This figure shows that by the sixth update the comfort error is indeed zero and the COP is 3.97. The optimal control vector at this point in time is given from the previous figure as r=592, c=993 and t=5. To show that this control does indeed result in an optimum COP, performance contours can be plotted in a three dimensional r, c, t space. The peak value of the COP on the zero pmv surface will define the optimal value of r, c and t. FIG. 8 shows this information. For clarity only a two dimensional space is shown (r-c space). The COP along the zero PMV contour is projected on both the r and c axis. The optimum value is seen to be 3.97 and this corresponds to r=592 and c=993, precisely the values obtained by the optimal controller.

A summary of the features of the invention is as follows:

The basis for the invention is an optimal control device for variable capacity air conditioning equipment which simultaneously controls a plurality of states within the conditioned environment while at the same time maximizing efficiency or minimizing power consumption of said conditioning equipment. The control device constructs a single index from a plurality of sensed variables and based on this index simultaneously adjusts all manipulated variables to the space conditioning equipment such that the index is maintained at the desired level set of the user and that said equipment operates in a maximally efficient manner. The index is automatically calculated by the control device to be indicative of comfort conditions in the conditioned environment. A setpoint of the comfort index is determined automatically by the control device in terms of input means adjusted by the user. The input means allows the user to input desired conditions on each parameter to be controlled in the environment. These inputs are automatically converted to a comfort index setpoint by the controller.

While a control device was described as controlling a thermal comfort index called a PMV;the device is not limited to a particular comfort index. Indeed it is envisioned that the device will be used to control not only thermal parameters such as temperatures, humidity and air velocity but also air quality parameters such as $CO_2$, VOC's, particulates, etc. Similarly the device is not limited to adjusting only the manipulated variables described above (r, c, t) but typically any manipulatable variable which can effect a change in the controlled variable (i.e. damper position, filter setting and the like).

Finally, the control device is not limited to the specific means for determining the updates on the manipulated variables. While the perturbation method utilizing the Jacobian search is the preferred approach, other methods such as brute force searches are also possible.

It is claimed:

1. A method for operating a system having variable speed equipment such as heat pumps and air conditioners while (1) achieving optimal comfort conditions in an air conditioned space and (2) maximizing the coefficient of performance (COP) of said equipment;

said equipment being characterized by having controls for varying equipment parameters thereof including compressor speed (r), indoor air flow rate (c), and evaporator superheat (t);

said system having multiple sensory inputs from which variable comfort influencing data parameters transmitted from said space to said equipment includes dry-bulb temperature (T), humidity ratio (w) and air velocity (V);

said method comprising the steps of:

providing a nonlinear measure of comfort function CI (T,w,V) based on said data parameters;

setting one of said data parameters and calculating default values for the other of said data parameters;

calculating a set point value for said comfort function;

expressing said function CI (T,w,V) in terms of said equipment parameters as a function of IC (r,c,t);

calculating a comfort error (CE) value which is set point value of CI (T,w,V) minus said CI (r,c,t);

selecting a nonlinear coefficient of performance function PE (r,c,t) based on said equipment parameters which is desired to be maximized and which is based on the same variables as said CI (r,c,t); and setting said controls to effect maximizing said PE (r,c,t) function while maintaining said (CE) value at substantially a zero value.

2. A method according to claim 1 wherein said maximizing is effected by relating said functions through a performance index (H) wherein $$H = PE + \lambda CE$$

with said $\lambda$ being a Lagrangian multiplier.

3. A method as set forth in claim 1 wherein said variable comfort influencing data parameters include $CO_2$ concentration, particulates and other air contaminants.

4. A method as set forth in claim 1 wherein said dry-bulb temperature (T) is set.

5. A method as set forth in claim 1 wherein said other of said data parameters are initially adjustable to provide a bias thereon.

6. A method for operating a system having variable speed equipment such as heat pumps and air conditioners while (1) achieving optimal comfort conditions in an air conditioned space and (2) maximizing the coefficient of performance (COP) of said equipment;

said equipment being characterized by having controls for varying parameters thereof;

said system having multiple sensory inputs from which variable comfort influencing data parameters are transmitted from said space to said equipment;

said method comprising the steps of:

providing a nonlinear measure of comfort function CI (data) based on said data parameters;

setting one of said data parameters and calculating default values for the other of said parameters;

calculating a set point value for said comfort function CI (data);

expressing said comfort function CI (data) in terms of said equipment parameters as a comfort function CI (manipulated control variables);

calculating a comfort error (CE) value which is said set point value of said CI (data) minus said CI (manipulated control variables);

selecting a nonlinear performance function PE (manipulated control variables) based on said equipment parameters which is desired to be maximized and which is based on the same variables as said CI (manipulated control variables); and setting said controls to effect maximizing said PE (manipulated control variables) function while maintaining said (CE) value at substantially a zero value.

7. A method according to claim 6 wherein said maximizing is effected by relating said functions CI (data) and CI (manipulated control variables) through a performance index (H) wherein $$H = PE + \lambda CE$$

with said $\lambda$ being a Lagrangian multiplier.

8. A method according to claim 6 wherein said comfort error (CE) and said set point value are continuously updated.

9. A method for operating a system having variable speed equipment such as heat pumps and air conditioners while (1) achieving optimal comfort conditions in an air conditioned space and (2) maximizing the coefficient of performance (COP) of said equipment;

said equipment being characterized by having controls for varying equipment parameters thereof including compressor speed (r), indoor air flow rate (c), and evaporator superheat (t);

said system having multiple sensory inputs from which variable comfort influencing data parameters transmitted from said space to said equipment includes dry-bulb temperature (T), humidity ratio (W) and air velocity (V);

said method comprising the steps of:

providing a nonlinear measure of comfort feature CI (T,w,V) based on said data parameters;

setting one of said data parameters and calculating default values for the other of said data parameters;

calculating a set point value for said comfort function;

expressing said function CI (T,w,V) in terms of said equipment parameters as a function of CI (r,c,t);

calculating a comfort error (CE) value which is said set point value of CI (T,w,V) minus said CI (r,c,t);

selecting a nonlinear coefficient of performance function PE (r,c,t) based on said equipment parameters which is desired to be maximized and which is based on the same variables as said CI (r,c,t);

representing said PE function as a performance index $L(x,u)$ and representing said CE function as a constraint function $f(x,u)$;

setting said controls to effect maximizing said PE (r,c,t) function while maintaining said (CE) value at substantially a zero value, said maximizing being effected by relating said functions through a performance index (H) wherein $H = L(x,u) + \lambda^T \cdot f(x,u)$ with said $\lambda^T$ being a Lagrangian multiplier, and x being state parameters and said u being a decision vector; and finding values of said decision vector at a stationary value of said $L(x,u)$ wherein $dL=0$ for arbitrary du while holding $df=0$.

10. A method for operating a space conditioning system having equipment characterized by variable operating parameters which both (1) achieves desired comfort conditions in the conditioned space and (2) maximizes the performance efficiency of said equipment, said equipment being characterized by controls for varying operating parameters thereof, said system having multiple sensory inputs from which a plurality of actual time-variable comfort influencing data parameter values are transmitted from said conditioned space to said equipment on a real-time basis, said system also having user-determined desired data parameter values; said method comprising the steps of:

calculating a desired comfort index set point based on said user determined desired data parameter values;

calculating an actual comfort index value based on said actual time-variable comfort influencing data parameter values;

calculating an equipment performance function based on said variable operating parameters and said desired comfort index set point; and adjusting said variable operating parameters of said equipment so as to maximize said equipment performance function while attempting to maintain said desired comfort index set point.

* * * * *